United States Patent
Rawat et al.

(10) Patent No.: US 8,252,437 B2
(45) Date of Patent: Aug. 28, 2012

(54) PLANARIZED MAGNETIC RECORDING DISK WITH PRE-PATTERNED SURFACE FEATURES AND SECURE ADHESION OF PLANARIZING FILL MATERIAL AND METHOD FOR PLANARIZING THE DISK

(75) Inventors: Vijay Prakash Singh Rawat, San Jose, CA (US); Kurt Allan Rubin, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 27 days.

(21) Appl. No.: 12/914,647

(22) Filed: Oct. 28, 2010

(65) Prior Publication Data
US 2012/0107646 A1 May 3, 2012

(51) Int. Cl.
*G11B 5/66* (2006.01)
(52) U.S. Cl. ........................................ 428/826
(58) Field of Classification Search ............... None
See application file for complete search history.

(56) References Cited

U.S. PATENT DOCUMENTS

| | | | |
|---|---|---|---|
| 6,586,044 | B1 | 7/2003 | Takeshita et al. |
| 7,225,528 | B2 | 6/2007 | Suwa et al. |
| 7,615,292 | B2 | 11/2009 | Ito et al. |
| 2009/0067092 | A1 | 3/2009 | Suwa et al. |
| 2009/0067093 | A1 | 3/2009 | Haginoya et al. |
| 2009/0081482 | A1 | 3/2009 | Kimura et al. |
| 2009/0135519 | A1* | 5/2009 | Hieda et al. ............ 360/110 |

* cited by examiner

*Primary Examiner* — Holly Rickman
(74) *Attorney, Agent, or Firm* — Thomas R. Berthold

(57) ABSTRACT

A magnetic recording disk has surface features of elevated lands and recessed grooves, and a planarized upper surface. A chemical-mechanical-polishing (CMP) stop layer is deposited over the lands and into the recesses. An adhesion film, like silicon, is deposited over the CMP stop layer, and fill material containing a silicon oxide ($SiO_x$) is deposited over and in contact with the adhesion film. The adhesion film improves the adhesion of the $SiO_x$ fill material and prevents delamination during a subsequent two-step CMP planarizing process.

27 Claims, 9 Drawing Sheets

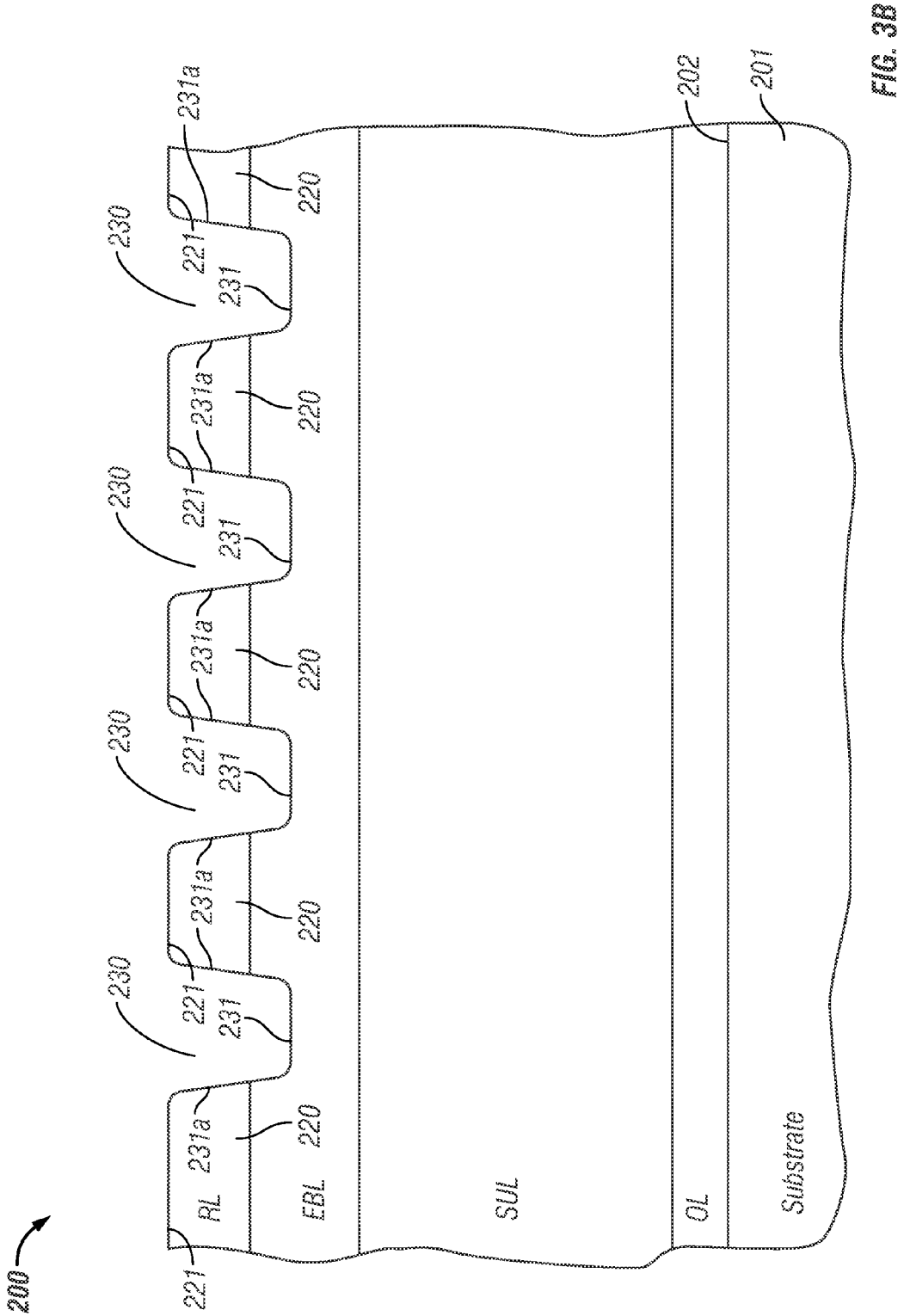

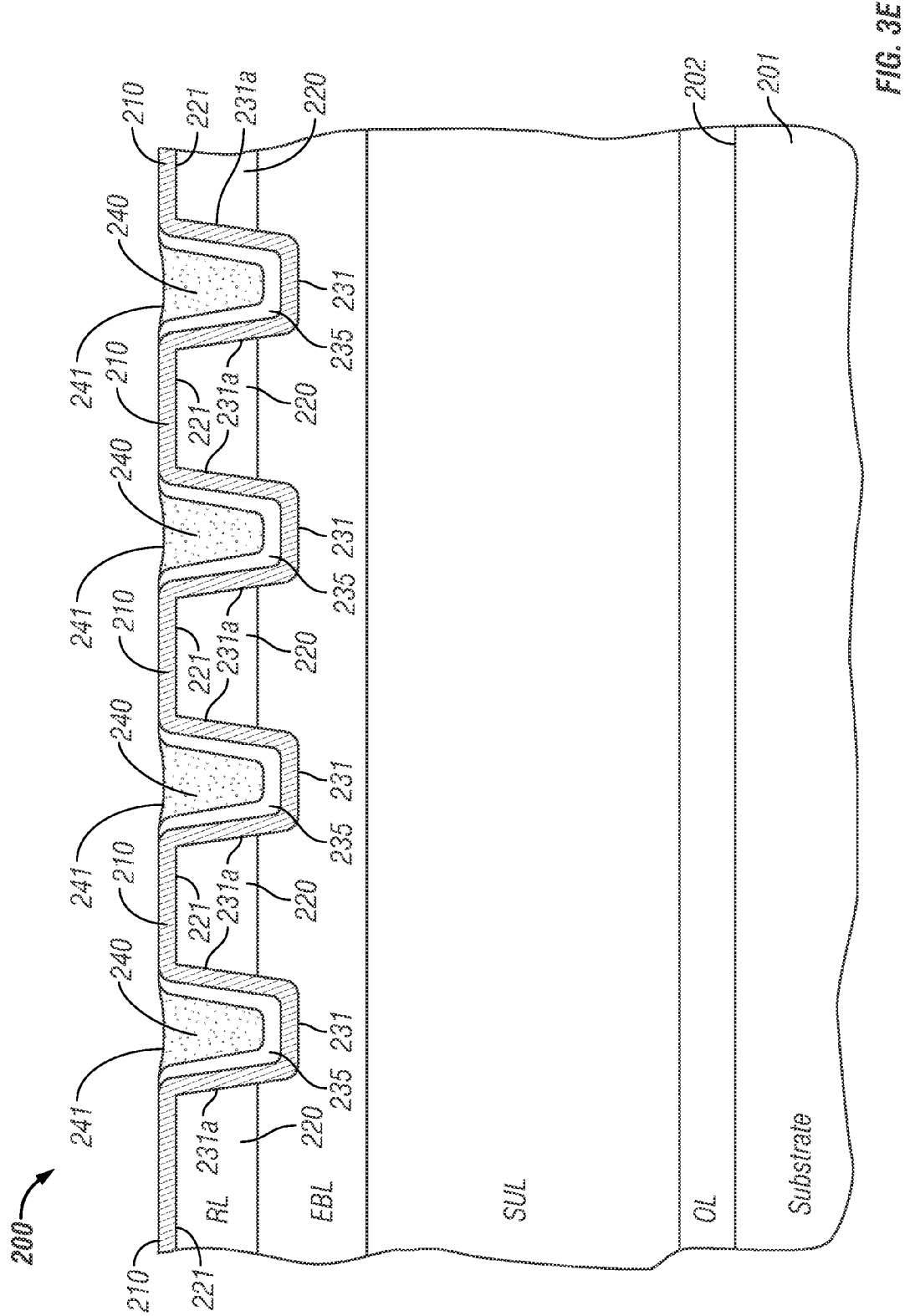

PLANARIZED MAGNETIC RECORDING DISK WITH PRE-PATTERNED SURFACE FEATURES AND SECURE ADHESION OF PLANARIZING FILL MATERIAL AND METHOD FOR PLANARIZING THE DISK

BACKGROUND OF THE INVENTION

1. Field of the Invention

This invention relates generally to a magnetic recording disk with pre-patterned surface features of elevated lands and recessed grooves or trenches, and more particularly to such a disk with a planarized surface.

2. Description of the Related Art

Conventional magnetic recording hard disk drives use either horizontal recording wherein the magnetized regions that define the magnetically recorded data bits are oriented in the plane of the recording layer on the hard disks, or perpendicular recording wherein the magnetized regions are oriented perpendicular to the plane of the recording layer. The conventional disk is a "continuous-media" (CM) disk wherein the recording layer is a continuous layer of magnetic material that becomes formed into concentric data tracks containing the magnetically recorded data bits when the write head writes on the magnetic material. The recording layer also includes a pre-recorded pattern of servo sectors that are used to position the read/write heads to the desired data tracks and maintain the heads on the data tracks during reading and writing. The conventional CM disk has a protective overcoat, typically formed of amorphous carbon, like diamond-like carbon (DLC), that covers the recording layer and provides a generally smooth planar surface. The read/write heads are located on air-bearing sliders that are supported above the smooth disk surface on a thin film of air or "air-bearing" as the disk rotates.

A variation of a CM disk is a "discrete-track media" (DTM) disk, meaning that the concentric data tracks of continuous magnetic material are radially separated from one another by concentric nonmagnetic guard bands. DTM disks are known in the art, as described for example in U.S. Pat. No. 4,912,585. In a DTM disk, the data tracks are typically elevated lands that contain magnetic material and the nonmagnetic guard bands are trenches or grooves that are recessed below the elevated lands. The nonmagnetic guard bands are either formed of nonmagnetic material or contain magnetic material but are recessed far enough below the elevated data tracks to not adversely the readback signals from the data tracks.

In addition to CM disks and DTM disks, magnetic recording disks with "bit-patterned media" (BPM) have been proposed to increase the data density. In BPM disks, the magnetizable material on the disk is patterned into small isolated data islands such that there is a single magnetic domain in each island or "bit". The single magnetic domains can be a single grain or consist of a few strongly coupled grains that switch magnetic states in concert as a single magnetic volume. This is in contrast to conventional CM disks wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. In one type of BPM disk, the data islands are elevated, spaced-apart pillars that are separated by nonmagnetic trenches or recesses.

DTM disks and BPM disks also require servo sectors that are angularly spaced around the disk and extend generally radially across the concentric data tracks. The servo sectors are pre-recorded patterns that cannot be written over by the write heads and that are used to position the read/write heads to the desired data tracks and maintain the heads on the data tracks during reading and writing. In both DTM disks and BPM disks, the servo sectors may be pre-patterned surface features of elevated servo blocks of magnetic material separated by nonmagnetic trenches or recesses.

There are several methods for fabricating disks with surface features of elevated lands and recessed grooves. In one technique, applicable for both DTM and BPM disks, all the required layers, including the layer or layers of magnetic recording material, are deposited on the disk substrate, typically by sputter deposition. The disk is then lithographically patterned into the desired pattern of data tracks and guard bands, as well as servo sectors. A vacuum etch process, such as ion milling or reactive ion etching (RIE), then removes the exposed magnetic recording material. This results in lands of magnetic material and nonmagnetic grooves recessed from the upper surface of the lands.

In another technique, particularly applicable for BPM disks, the disks are produced by replication from a mold via nanoimprinting. The nanoimprinting process forms not only the isolated data islands in the data tracks, but also the servo blocks in the servo sectors. In nanoimprinting, a mold or template replicates a topographic pattern of surface features onto a polymeric resist coating on the disk substrate. The disk substrate may have a dielectric coating, such as a silicon nitride film. The nanoimprinted resist pattern is then used as a mask for etching the pattern into the silicon nitride film with a fluorine plasma. After etching the silicon nitride, the resist is removed. Magnetic material is then sputter deposited over the lands and grooves. The grooves may be recessed far enough from the read/write heads to not adversely affect reading or writing, or they may be "poisoned" with a dopant material to render them nonmagnetic.

For DTM disks and BPM disks there is a need to planarize the surface topography so that the slider is maintained at a relatively constant "fly height" by the air-bearing generated by the rotating disk. Planarization is especially important to reduce or eliminate slider excitations induced by transitioning from a data to servo region or from a servo to data region. The planarization is typically accomplished by deposition of nonmagnetic fill material in the recessed grooves or trenches, followed by chemical-mechanical-polishing (CMP). However, the nonmagnetic fill material may become delaminated during CMP.

What is needed is a disk with pre-patterned surface features of elevated lands and recessed grooves or trenches that has a planarized surface where there is secure adhesion of the fill material in the grooves or trenches.

SUMMARY OF THE INVENTION

The invention relates to a planarized magnetic recording disk with surface features of elevated lands and recessed grooves, and a method using chemical-mechanical-polishing (CMP) to planarize the disk. A CMP stop layer is deposited over the lands and into the recesses. The CMP stop layer is preferably amorphous carbon, like diamond-like carbon (DLC), which may be also be hydrogenated and/or nitrogenated. An adhesion film is deposited over the CMP stop layer, and fill material containing silicon and oxygen is then deposited over and in contact with the adhesion film. The adhesion film improves the adhesion of the fill material and prevents delamination during the subsequent CMP planarizing process. The adhesion film is preferably pure (oxygen-free) silicon and the fill material is preferably a silicon oxide ($SiO_x$) wherein the oxygen stoichiometry is between $SiO_{0.1}$ and $SiO_{2.2}$. In an alternative embodiment the silicon adhesion film and $SiO_x$ fill material may together form a continuous layer of silicon oxide wherein the amount of oxygen increases with increasing thickness of the layer.

A first CMP step using a slurry containing ceria (cerium oxide) polishes off the $SiO_x$ fill material above the silicon adhesion film on the lands. A second CMP step using a slurry containing silica, preferably colloidal silica, polishes off the silicon adhesion film on the lands, leaving the CMP stop layer on the lands with the upper surface of the CMP stop layer on the lands and the upper surface of the fill material in the recesses forming an essentially planarized surface. The CMP stop layer can function as the protective overcoat. Alternatively, the CMP stop layer on the lands can be removed and a protective overcoat deposited over the upper surface of the lands and upper surface of the recesses.

For a fuller understanding of the nature and advantages of the present invention, reference should be made to the following detailed description taken together with the accompanying figures.

BRIEF DESCRIPTION OF THE DRAWINGS

FIGS. 3A-3F are sectional views of a DTM disk taken along a plane perpendicular to the discrete data tracks at various stages of the method for planarizing a disk according to the invention.

DETAILED DESCRIPTION OF THE INVENTION

Figure 1:
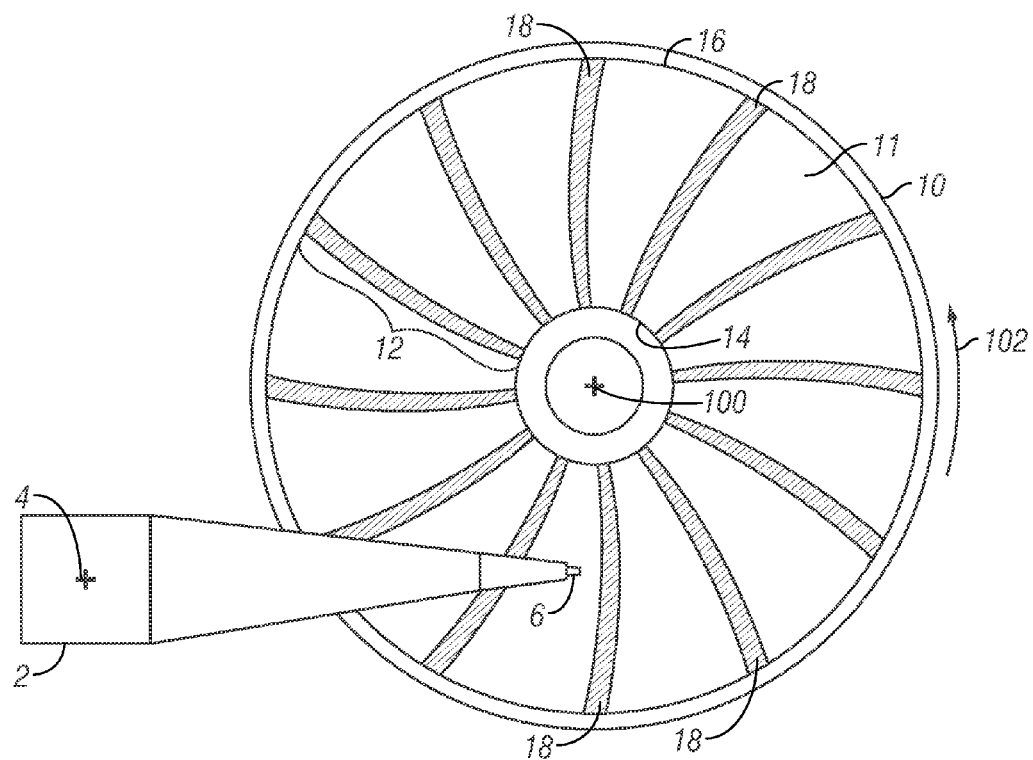
FIG. 1 is a schematic of a disk drive with a rotary actuator and a rigid magnetic recording disk that may be a discrete-track media (DTM) disk or a bit-patterned media (BPM) disk with pre-patterned servo sectors.

FIG. 1 illustrates a disk drive with a rotary actuator 2 and a rigid magnetic recording disk 10 having pre-patterned surface features formed on surface 11. The surface features include at least pre-patterned servo blocks in angularly-spaced servo sectors 18. The disk 10 rotates in the direction 102 about a central axis 100. The surface 11 has an annular data band 12 which is defined by an inside diameter (ID) 14 and an outside diameter (OD) 16. The portions of the data band between the servo sectors 18 are used for the storage of user data and contain circular data tracks, with each data track being typically divided into physical data sectors. The disk 10 may be a DTM disk, in which case the circular data tracks are discrete radially-spaced elevated tracks separated by recessed guard bands, with the elevated tracks and recessed guard bands forming surface features in addition to the servo blocks in servo sectors 18. The disk 10 may also be a BPM disk, in which case the circular data tracks contain discrete elevated data islands separated by recesses, with the elevated islands and recesses forming surface features in addition to the servo blocks in servo sectors 18.

The rotary actuator 2 rotates about pivot 4 and supports a read/write head 6 at its end. As the actuator 2 rotates, the head 6 follows a generally arcuate path between ID 14 and OD 16.

The servo sectors 18 form a pattern of angularly spaced arcuate lines that extend generally radially from ID 14 to OD 16. The arcuate shape of the servo sectors matches the arcuate path of head 6. During operation of the disk drive, the head 6 reads or writes data on a selected one of a number of concentric circular data tracks located between the ID 14 and OD 16 of the annular data band 12. To accurately read or write data from a selected track, the head 6 is required to be maintained over the centerline of the track. Accordingly, each time one of the servo sectors 18 passes beneath the head 6, the head 6 detects discrete magnetized servo blocks in the position error signal (PES) field in the servo sector. A PES is generated and used by the disk drive's head positioning control system to move the head 6 towards the track centerline. Thus, during a complete rotation of the disk 10, the head 6 is continually maintained over the track centerline by servo information from the servo blocks in successive angularly spaced servo sectors 18.

Figure 2A:
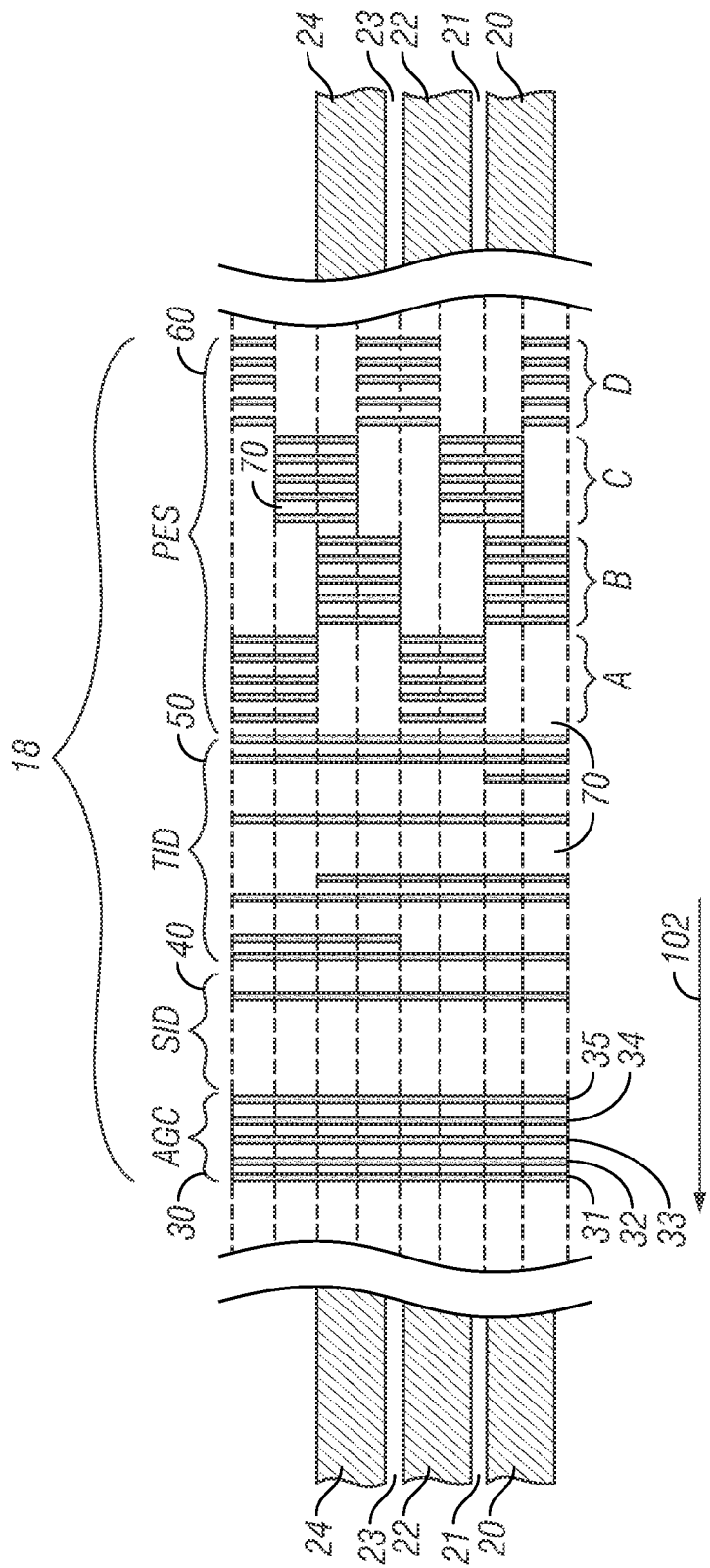
FIG. 2A is a schematic of a top view of a DTM disk and shows a typical servo sector with elevated servo blocks and portions of three elevated data tracks separated by recessed guard bands.

FIG. 2A is an expanded top view of disk 10 where the disk is a DTM disk and shows a typical servo sector 18 and portions of three DTM data tracks 20, 22, 24. Three discrete elevated data tracks 20, 22, 24 and two recessed guard bands 21, 23 are shown. All of the shaded portions of servo sector 18 represent discrete elevated servo blocks magnetized in the same direction. They may all be magnetized in the same direction horizontally, i.e., in the plane parallel to the plane of the paper in FIG. 2A if the disk drive is designed for longitudinal or horizontal magnetic recording, or perpendicularly, i.e., into or out of the plane of the paper if the disk drive is for perpendicular magnetic recording. The non-shaded regions 70 in servo sector 18, and the guard bands 21, 23, represent nonmagnetic regions that are recessed from the elevated servo blocks and elevated data tracks 20, 22, 24. The term "nonmagnetic" means that the regions 70 between the servo blocks, and guard bands 21, 23 between the data tracks 20, 22, 24, are recesses or grooves that contain a nonferromagnetic material, such as a dielectric, or a material that has no substantial remanent moment in the absence of an applied magnetic field, or a ferromagnetic material that is recessed far enough below the elevated servo blocks to not adversely affect reading or writing. The nonmagnetic regions 70 and guard bands 21, 23 may also be recessed grooves or trenches in the magnetic recording layer or disk substrate that contain no ferromagnetic material.

The servo blocks that make up servo sector 18 are arranged in fields 30, 40, 50 and 60, as shown in FIG. 2A. Servo field 30 is an automatic gain control (AGC) field of blocks 31-35 that are used to measure the amplitude of the signal and adjust the gain for the subsequently read servo blocks. Servo field 40 is sector identification (SID) field, also called a servo timing mark or S™ field, to provide a timing mark to establish start/stop timing windows for subsequent servo blocks. Servo field 50 is a track identification (TID), also called the cylinder or CYL field because the tracks from all of the disk surfaces in a disk drive with a multiple stacked disks from a "cylinder" of tracks. The TID field 50 contains the track number, typically Gray-coded, and determines the integer part of the radial position. Servo field 60 is the position error signal (PES) field, which in this example contain A, B, C, D subfields of servo blocks as part of the well-known "quad-burst" PES pattern, and are used to determine the fractional part of the radial position.

Figure 2B:
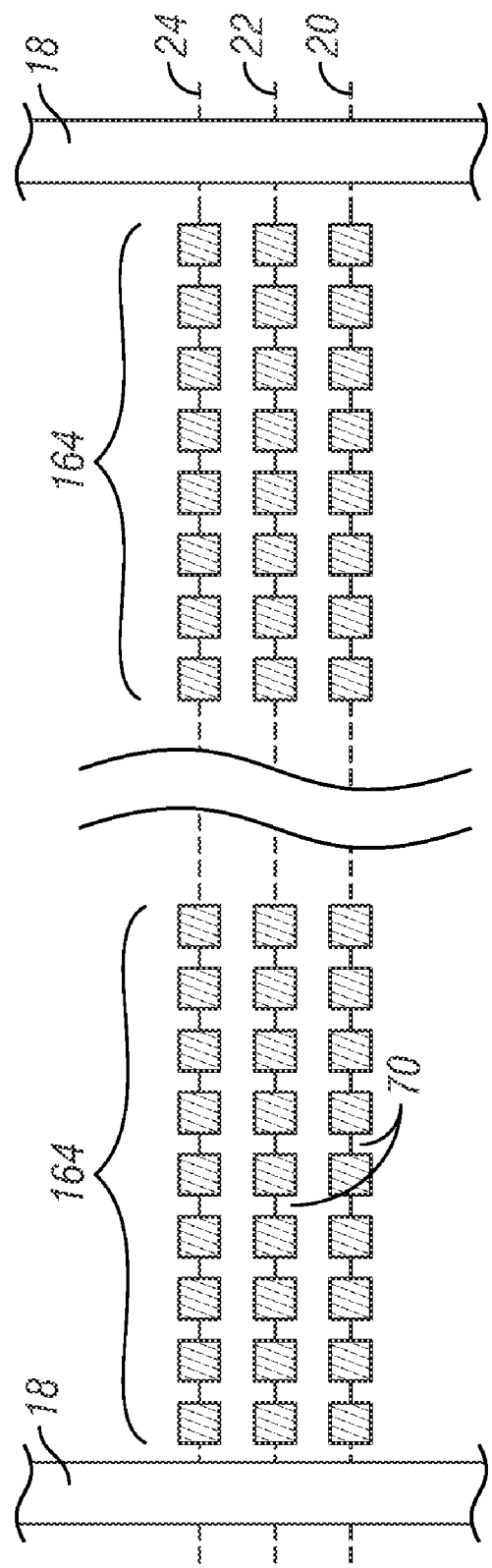
FIG. 2B is a schematic of a top view of a portion of a BPM disk and shows three data tracks each containing discrete isolated data islands separated by recessed nonmagnetic regions.

FIG. 2B is a schematic illustration of a top view of a portion of disk 10 where the disk is a BPM disk. The three data tracks 20, 22, 24 each contain discrete isolated data islands 164 and are shown with two successive servo sectors 18 that extend generally radially across the concentric data tracks 20, 22, 24.

The islands 164 are depicted as having a square shape, but the islands may be patterned in different shapes, such as circular, generally elliptical or generally rectangular. Like the servo blocks in servo sector 18 (FIG. 2A), each data track 20, 22, 24 contains discrete elevated spaced-apart lands that are islands 164 of magnetic material. The discrete islands are separated from other islands by recessed nonmagnetic regions 70. The BPM disk shown in FIG. 2B thus contains surface features of elevated lands and recessed grooves not only in the servo sectors 18, but also in the data tracks 20, 22, 24.

The planarized disk with surface features of elevated lands and recessed grooves according to the invention, and the method for planarizing the disk, will be explained with FIGS. 3A-3F, which show sectional views of a DTM disk taken along a plane perpendicular to the discrete data tracks at various stages of the method. However, the method and resulting disk planarized by the method are also fully applicable to a BPM disk. In this invention a chemical-mechanical-polishing (CMP) stop layer is deposited into the recesses and an adhesion film is located between the CMP stop layer and the nonmagnetic fill material. The adhesion film improves the adhesion of the fill material and prevents delamination during the subsequent CMP planarizing process. The nonmagnetic fill material is silicon oxide ($SiO_x$) and the preferred adhesion film is silicon.

Figure 3A:
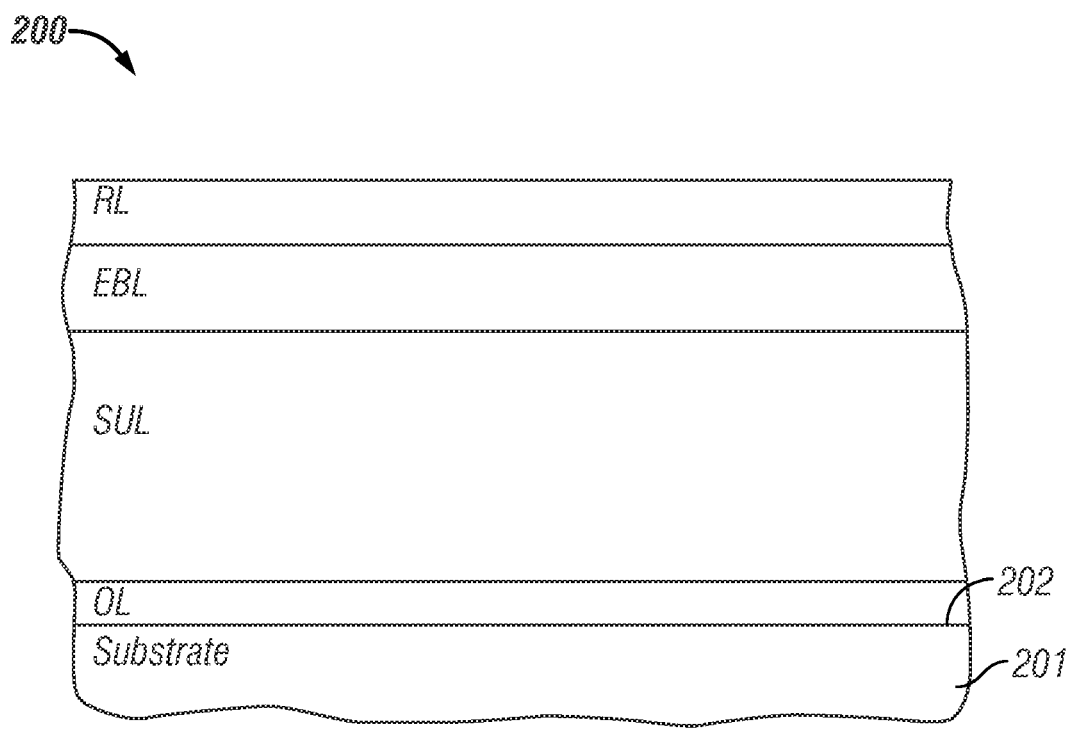

FIG. 3A is a sectional view showing the disk 200 prior to lithographic patterning and etching to form the DTM disk. The disk 200 is a substrate 201 having a generally planar surface 202 on which the representative layers are deposited, typically by sputtering. The disk 200 is depicted as a perpendicular magnetic recording disk with a recording layer (RL) having perpendicular (i.e., generally perpendicular to substrate surface 201) magnetic anisotropy and an optional soft magnetic underlayer (SUL) below the RL. The optional SUL serves as a flux return path for the magnetic write field from the disk drive write head.

The hard disk substrate 201 may be any commercially available glass substrate, but may also be a conventional aluminum alloy with a NiP surface coating, or an alternative substrate, such as silicon, canasite or silicon-carbide. An adhesion layer or onset layer (OL) for the growth of the SUL may be an AlTi alloy or a similar material with a thickness of about 2-10 nm is deposited on substrate surface 202.

The SUL may be formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr or alloys thereof. The SUL may have a thickness in the range of about 5 to 50 nm.

An exchange-break layer (EBL) is typically located on top of the SUL. It acts to break the magnetic exchange coupling between the magnetically permeable films of the SUL and the RL and also serves to facilitate epitaxial growth of the RL. The EBL may not be necessary, but if used it can be a nonmagnetic titanium (Ti) layer; a non-electrically-conducting material such as Si, Ge and SiGe alloys; a metal such as Cr, Ru, W, Zr, Nb, Mo, V and Al; a metal alloy such as amorphous CrTi and NiP; an amorphous carbon such as $CN_x$, $CH_x$ and C; or oxides, nitrides or carbides of an element selected from the group consisting of Si, Al, Zr, Ti, and B. The EBL may have a thickness in the range of about 5 to 40 nm.

The RL may be a single layer or multiple layers of any of the known amorphous or crystalline materials and structures that exhibit perpendicular magnetic anisotropy. Thus, the RL may be a layer of granular polycrystalline cobalt alloy, such as a CoPt or CoPtCr alloy, with a suitable segregant such as oxides of one or more of Si, Ta, Ti, Nb, Cr, V and B. Also, the RL may be composed of multilayers with perpendicular magnetic anisotropy, such as Co/Pt, Co/Pd, Fe/Pt and Fe/Pd multilayers, with or without a suitable segregant such as those mentioned above. In addition, perpendicular magnetic layers containing rare earth elements are useable for the RL, such as CoSm, TbFe, TbFeCo, GdFe alloys. The RL may also be formed of chemically ordered CoPt, CoPd, FePt or FePd. These chemically ordered alloys, in their bulk form, are known as face-centered tetragonal (FCT) $L1_0$-ordered phase materials (also called CuAu materials). The c-axis of the $L1_0$ phase is the easy axis of magnetization and is oriented perpendicular to the substrate. Like the Co/Pt and Co/Pd multilayers, these layers exhibit very strong perpendicular magnetic anisotropy. The total thickness of the RL is typically in the range of about 5 to 25 nm.

FIG. 3B is a sectional view of the disk 200 after lithographic patterning and etching. The etching may be a vacuum etching process like ion milling or reactive ion etching (RIE). After etching, elevated lands 220 of RL material and grooves or recesses 230 are formed above the substrate surface 202. The lands 220 have an upper surface 221. The recesses 230 have a lower surface 231 below the upper surface 221 of the lands 220 and sidewalls 231a. For a DTM disk the lands 220 and recesses 230 are concentric rings aligned in the circumferential direction, with the concentric recesses 230 being gaps between the lands that function to separate the concentric lands in the radial direction. The typical depth of the recesses 230, which is also essentially the height of the lands 220, is in the range of about 10 to 50 nm and the typical width of the recesses is in the range of about 10 to 50 nm. In the example shown in FIG. 3B, the etching has been performed to a depth such that all of the RL material and a portion of the EBL material has been removed from the regions of the recesses 230. However, alternatively the etching can be performed to a depth such that only a portion of the RL material is removed. In that case, there would be a layer of RL material below the lower surface 231 of the recesses 230.

Figure 3C:
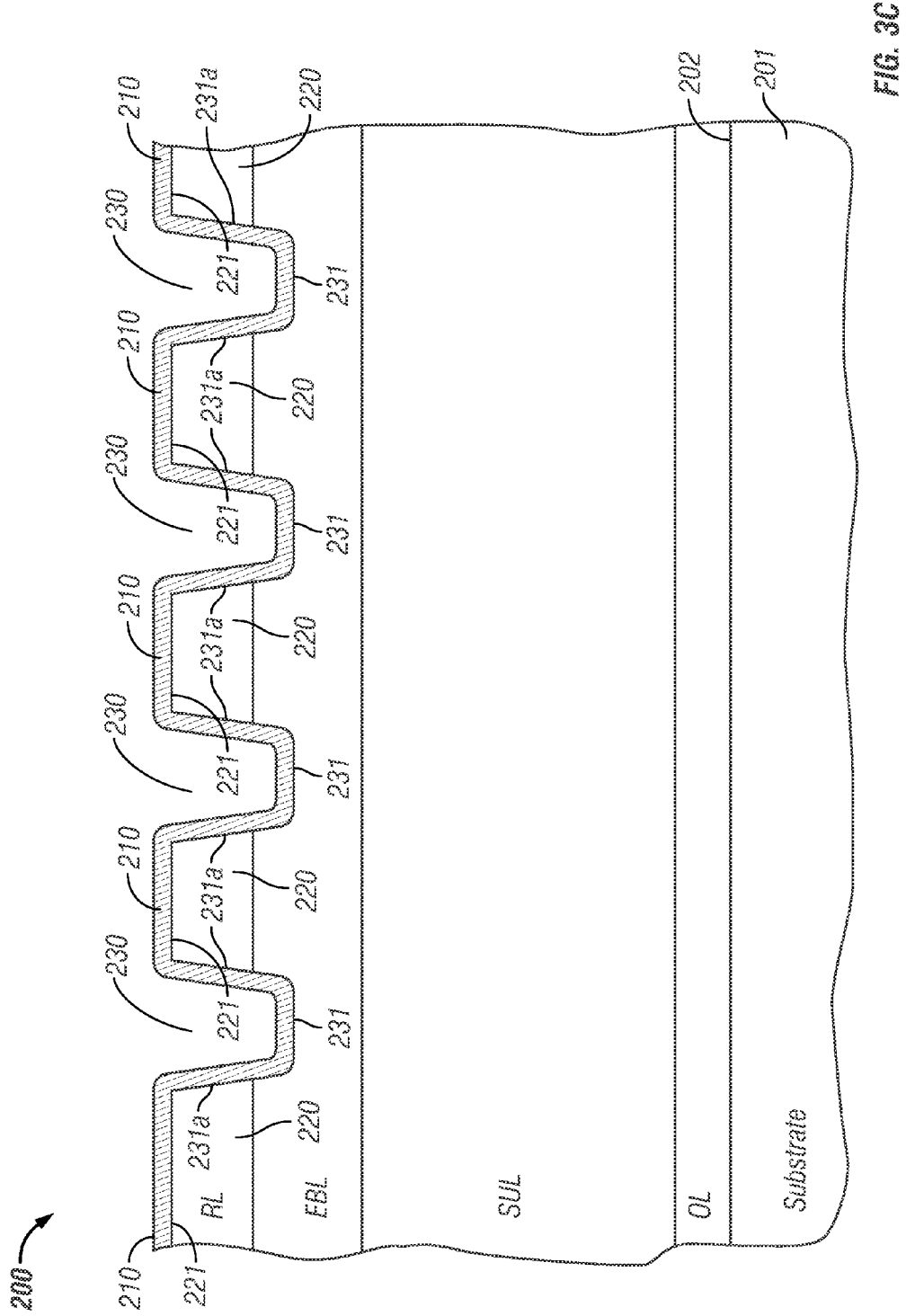

FIG. 3C is a sectional view of the disk 200 after deposition of CMP stop layer 210. The CMP stop layer 210 is deposited on the top surface 221 of the lands 220 and into the recesses 230. This results in the CMP stop layer 210 being located on the lower surface 231 of the recesses and on the sidewalls 231a of the recesses. The CMP stop layer 210 is preferably a layer of amorphous carbon, like diamond-like carbon (DLC). The amorphous carbon or DLC may also be hydrogenated and/or nitrogenated, as is well-known in the art. Alternatively, the CMP stop layer 210 may be a silicon nitride, such as $Si_3N_4$ or deviations from this stoichiometry, including nitrogen-deficient silicon nitride with unsaturated dangling bonds of Si (commonly referred to as $SiN_x$). The CMP stop layer may also be made from transition metal nitrides such as TiN, TaN, VN and WN, or transition metal carbides such as TiC, WC, SiC and TaC. The CMP stop layer may be deposited by sputter deposition to a thickness of about 0.2 to 4 nm. The thickness of the CMP stop layer may be different on the lands, sidewalls and recesses. The CMP stop layer can be a monolayer, bilayer or multilayer, such as a stack of alternating layers of silicon and carbon built up as a multilayer.

Figure 3D:
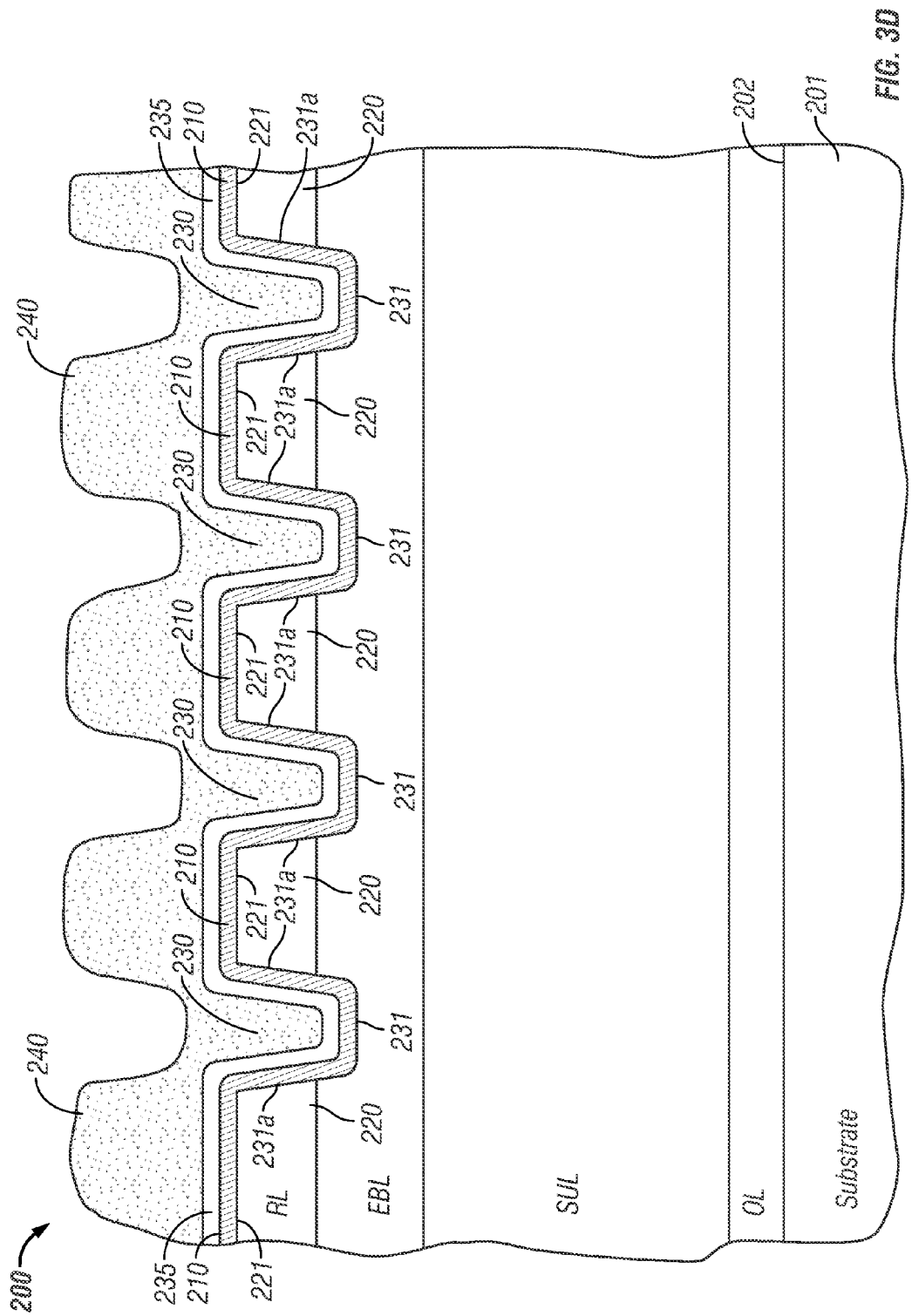
Figure 3F:
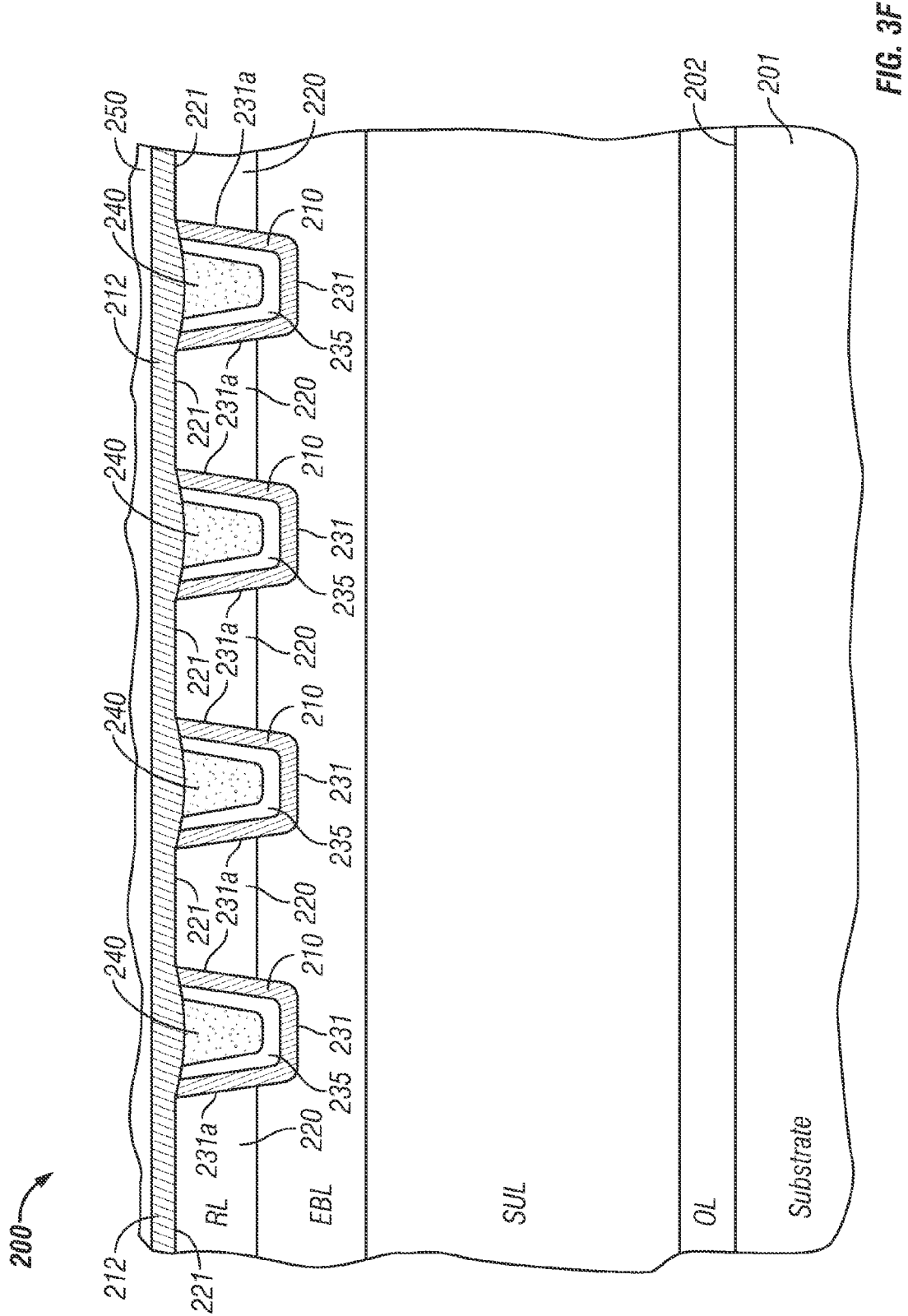

FIG. 3D is a sectional view of the disk 200 after deposition of the nonmagnetic adhesion film 235 and nonmagnetic fill material 240 over the CMP stop layer 210. The adhesion film 235 is deposited to a thickness of about 0.1 to 3 nm and covers the CMP stop layer 210 in the recesses 230, including the portions of CMP stop layer 210 next to the sidewalls 231a. The thickness of the adhesion film 235 on the sidewalls 231a may be different from the thickness at the lower surfaces 231 of the recesses 230. The adhesion film 235 is preferably amorphous silicon sputter deposited to a thickness of about 0.1 to 3 nm. The nonmagnetic fill material 240 is deposited to a thickness sufficient to completely fill the recesses 230, at least to a height above the CMP stop layer 210 on the lands 220. This results in fill material 240 being deposited on top of the portions of CMP stop layer 210 on the elevated lands 220. The nonmagnetic fill material 240 comprises silicon and oxygen, and is preferably a silicon oxide ($SiO_x$) wherein the oxygen stoichiometry is between $SiO_{0.1}$ and $SiO_{2.2}$. The fill material may also be $SiO_xN_y$ where x is in the range of 0.1 to 2.2 and y is in the range of 0.1 to 1.5.

In an alternative embodiment the adhesion film 235 and fill material 240 may be one compositionally graded layer wherein the amount of oxygen is larger in regions of the fill material that are away from the CMP stop layer interface. In this embodiment there is no or very little oxygen near the CMP stop layer 210, with the highest amount of oxygen being near the top of the recesses 230. This type of compositionally graded oxide layer where the low-oxygen or oxygen-free adhesion portion of the layer is in contact with the CMP stop layer 210 may be deposited by vacuum deposition. One way to achieve this is to do sputter deposition from a pure silicon target where the flow rate of oxygen into the sputtering chamber is gradually increased to control the oxygen incorporation in the fill material layer. The flow rate may be increased monotonically and then held at a steady value for the duration of the deposition or it may be continually increased during the deposition. The flow rate is chosen to give a reaction rate of the oxygen with the silicon to yield the desired stoichiometry. A low flow rate of oxygen will lead to an oxygen-deficient $SiO_x$ composition where $0 \leq x \leq 2.2$. An excessive flow rate of oxygen will saturate the composition closer to a value of $SiO_x$ with a value of x in the range of 1.8 to 2.2. Another way is to keep the oxygen flow rate constant and gradually vary the DC, RF or pulsed DC power to the silicon target during this deposition process. A third way is to vary the oxygen flow rate as well as the power supplied to the Si target.

While pure (oxygen-free) silicon is the preferred material for adhesion film 235, selected metals like Ti, Ta, V and Cr and their alloys, including oxides, nitrides and oxynitrides of these metals or metal alloys, may also function as adhesion films. These alternative adhesion films would preferably have a thickness of about 0.1 to 3 nm.

FIG. 3E is a sectional view of the disk 200 after CMP has removed the fill material 240 down to the CMP stop layer 210. CMP is a well-known process widely used in semiconductor manufacturing and thin-film magnetic recording head manufacturing. The CMP slurry may include a liquid that makes the surface layer of the fill material have reduced adhesion for more easy removal and a particle that helps cut through the fill material to remove it. CMP slurries with different chemical properties are commercially available and are selected based on the material to be removed. The CMP process can be conducted in a number of ways. In a first CMP step, a slurry containing ceria (cerium oxide) is used. The ceria slurry has a relatively fast rate of removal of $SiO_x$ and it will stop polishing when the $SiO_x$ fill layer is removed above the silicon adhesion film. The processing would be calibrated, by time for instance, to just slightly overpolish the $SiO_x$ fill material. Then a second CMP step is performed using a slurry containing colloidal silica to polish off the silicon adhesion film. It will stop polishing when the CMP stop layer 210 is reached. Again, the second CMP step would be calibrated, for instance by time, to slightly overpolish the silicon adhesion film, which will result in a small amount of recession of the fill material 240 in the recesses relative to the top surfaces of the CMP stop layer 210 on the lands 220. Also various CMP endpoint detection systems and techniques are known. For example, measurement of platen and carrier motor current and measurement of platen temperature by infrared (IR) sensor can also be used to determine when the CMP process has reached the CMP stop layer 210. The fill material 240 now remains in the recesses on top of the adhesion film 235, including along the portions of the adhesion film 235 in contact with the portions of CMP stop layer 210 next to the sidewalls 231a. The upper surface 241 of the fill material 240 in the recesses may experience a very slight recession following CMP, as depicted in FIG. 3E. However, the upper surfaces 241 of the recesses and the upper surfaces of CMP stop layer 210 on the elevated lands 220 are essentially coplanar and together form a substantially planar surface. As used herein, "substantially planar" means that the recession of upper surface 241 of the fill material in the recesses is less than about 5 nm from the upper surface of CMP stop layer 210 and not extending above the upper surface of CMP stop layer 210 by more than about 1 nm. It has also been determined that if the CMP stop layer 210 is amorphous carbon, some silicon may remain on and become embedded in the upper surface of the amorphous carbon CMP stop layer 210 after the CMP has removed the fill material 240 and the adhesion film 235 from above the CMP stop layer 210.

It is also possible to continue the CMP after the fill material 240 and adhesion film 235 are substantially removed from above the CMP stop layer 210. The CMP would be continued until a recession depth greater than the thickness of the CMP stop layer 210 was achieved in the recesses. For example, if a 2 nm thick amorphous carbon CMP stop layer 210 was used, the CMP would continue until the recession of the fill material 240 in the recesses region was greater than 2 nm. Then the surfaces 241 of the fill material 240 would be at least 2 nm below the top of the top surface of the CMP stop layer 210 on the lands 220. Then the CMP stop layer 210 would be removed by a vacuum etch process, such as by RIE, which would result in an essentially coplanar continuous surface between the recessed surfaces 241 and the top surfaces 221 of lands 220. The coplanar surface would then be coated with a continuous protective overcoat, as described below in the description of FIG. 3F.

In FIG. 3E the CMP stop layer 210 on the elevated lands 220 may function as a protective overcoat for the RL material in the lands 220, in which case a lubricant layer (not shown) may be deposited to complete the disk structure. However, alternatively the CMP stop layer 210 on the elevated lands 220 in FIG. 3E may be removed, such as by vacuum etching or RIE. This would then be followed by sputter deposition of a protective overcoat and deposition of the lubricant layer. Such a disk structure is shown in the sectional view of FIG. 3F with protective overcoat 212 and lubricant layer 250. The protective overcoat layer 212 is deposited, typically by sputter deposition, on the substantially planar surface of the upper surface 221 of the lands 220 and the upper surface 241 of the fill material 240. The overcoat layer 212 is preferably sputter deposited amorphous carbon, like DLC, which may also be hydrogenated and/or nitrogenated. Other materials that may be used for overcoat layer 212 include carbides such as silicon carbides and boron carbides; nitrides such as silicon nitrides, titanium nitrides, and boron nitrides; metal oxides, such as $TiO_2$, $ZrO_2$, $Al_2O_3$, $Cr_2O_3$, $Ta_2O_5$ and $ZrO_2—Y_2O_3$; and mixtures of these materials. The lubricant layer 250 may be a conventional disk lubricant, like a perfluorinated polyether (PFPE) polymer, that is either bonded or unbounded to the overcoat 212. The lubricant is typically applied by dipping the disk into a solution of the PFPE in a suitable solvent and then evaporating the solvent.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk comprising:
a substrate having a generally planar surface;
a plurality of elevated lands comprising magnetic recording material on the substrate, the lands having an upper surface above the substrate surface;
a plurality of recesses on the substrate between the lands, the recesses having a lower surface lower than the upper surface of the lands and sidewalls extending from said lower surface;
a chemical-mechanical-polishing (CMP) stop layer in contact with the lower surface and sidewalls of the recesses, the CMP stop layer selected from an amorphous carbon layer, a silicon nitride ($SiN_x$) layer and a multilayer of alternating films comprising carbon and silicon;
fill material comprising silicon and oxygen in the recesses; and
an adhesion film in the recesses between and in contact with the CMP stop layer and the fill material.

2. The disk of claim 1 wherein the adhesion film consists essentially of silicon.

3. The disk of claim 1 wherein the adhesion film and fill material together form a continuous layer of silicon and oxygen having graduated increasing oxygen content with thickness, wherein the oxygen content is lowest near the CMP stop layer.

4. The disk of claim 1 wherein the fill material comprises silicon oxide wherein the oxygen stoichiometry is between $SiO_{0.1}$ and $SiO_{2.2}$.

5. The disk of claim 4 wherein the adhesion film is a substantially oxygen-free film consisting essentially of silicon.

6. The disk of claim 1 wherein the adhesion film has a thickness greater than or equal to 0.1 nm and less than or equal to 3 nm.

7. The disk of claim 1 wherein the adhesion film is selected from the group consisting of Ti, Ta, V, Cr; an alloy of Ti, Ta, V or Cr; an oxide of Ti, Ta, V or Cr; and a nitride of Ti, Ta, V or Cr.

8. The disk of claim 1 wherein the CMP stop layer is also on the upper surface of the lands.

9. The disk of claim 8 wherein the CMP stop layer consists essentially of amorphous carbon and further comprising silicon embedded in the upper surface of the CMP stop layer on the upper surface of the lands.

10. The disk of claim 8 wherein the upper surface of the CMP stop layer on the lands is substantially coplanar with the upper surface of the fill material in the recesses.

11. The disk of claim 10 further comprising a lubricant layer on said substantially coplanar upper surfaces of the CMP stop layer on the lands and the fill material in the recesses.

12. The disk of claim 1 wherein the upper surface of the lands is substantially coplanar with the upper surface of the fill material in the recesses, and further comprising a protective overcoat on said substantially coplanar surfaces.

13. The disk of claim 12 further comprising a lubricant layer on the protective overcoat.

14. The disk of claim 1 wherein the magnetic recording layer material in the lands has magnetic anisotropy generally perpendicular to the substrate surface.

15. The disk of claim 1 further comprising a soft magnetic underlayer (SUL) on the substrate surface below the lands and recesses and a exchange-break layer (EBL) on the SUL below the lands and recesses.

16. The disk of claim 1 further comprising a layer of magnetic material on the substrate below the recesses and the lands.

17. The disk of claim 1 wherein the disk is a discrete-track media disk and wherein the lands comprise radially-spaced concentric tracks and the recesses with fill material comprise radially-spaced guard bands between the tracks.

18. The disk of claim 1 wherein the disk is a bit-patterned media disk and wherein the lands comprise discrete data islands and the recesses with fill material comprise regions between the data islands.

19. The disk of claim 1 wherein the lands comprise generally radially-directed servo blocks and the recesses comprise regions between the servo blocks.

20. A magnetic recording disk comprising:
a substrate having a generally planar surface;
a plurality of elevated lands formed of magnetic recording material on the substrate, the lands having an upper surface above the substrate surface;
a plurality of recesses on the substrate between the lands, the recesses having a lower surface lower than the upper surface of the lands and sidewalls extending from said lower surface;
a chemical-mechanical-polishing (CMP) stop layer selected from amorphous carbon and a silicon nitride in contact with the lower surface and sidewalls of the recesses;
fill material in the recesses and comprising silicon oxide wherein the oxygen stoichiometry is between $SiO_{0.1}$ and $SiO_{2.2}$; and
an adhesion film consisting essentially of silicon in the recesses between and in contact with the CMP stop layer and the fill material.

21. The disk of claim 20 wherein the adhesion film and fill material together form a continuous layer comprising silicon and oxygen having graduated increasing oxygen content with thickness, wherein there is no oxygen near the CMP stop layer.

22. The disk of claim 20 wherein the CMP stop layer is also on the upper surface of the lands, and wherein the upper surface of the CMP stop layer on the lands is substantially coplanar with the upper surface of the fill material in the recesses.

23. The disk of claim 20 wherein the upper surface of the lands is substantially coplanar with the upper surface of the fill material in the recesses, and further comprising a protective overcoat on said substantially coplanar surfaces.

24. The disk of claim 20 wherein the disk is a discrete-track media disk and wherein the lands comprise radially-spaced concentric tracks and the recesses with fill material comprise radially-spaced guard bands between the tracks.

25. The disk of claim 20 wherein the disk is a bit-patterned media disk and wherein the lands comprise discrete data islands and the recesses with fill material comprise regions between the data islands.

26. A magnetic recording disk comprising:
a substrate having a generally planar surface;
a plurality of elevated lands comprising magnetic recording material on the substrate, the lands having an upper surface above the substrate surface;
a plurality of recesses on the substrate between the lands, the recesses having a lower surface lower than the upper surface of the lands and sidewalls extending from said lower surface;
a chemical-mechanical-polishing (CMP) stop layer in contact with the lower surface and sidewalls of the recesses; fill material comprising silicon and oxygen in the recesses; and
an adhesion film in the recesses between and in contact with the CMP stop layer and the fill material, wherein the adhesion film and fill material together form a continuous layer of silicon and oxygen having graduated increasing oxygen content with thickness, wherein the oxygen content is lowest near the CMP stop layer.

27. The disk of claim 26 wherein the CMP stop layer is formed of a material selected from amorphous carbon and a silicon nitride ($SiN_x$).

* * * * *